(12) United States Patent
Franco et al.

(10) Patent No.: US 12,065,621 B2
(45) Date of Patent: *Aug. 20, 2024

(54) SAWDUST CHARCOAL

(71) Applicants: Riki Franco, New York, NY (US); Oron Franco, New York, NY (US)

(72) Inventors: Riki Franco, New York, NY (US); Oron Franco, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/112,508

(22) Filed: Feb. 22, 2023

(65) Prior Publication Data
US 2023/0203392 A1 Jun. 29, 2023

Related U.S. Application Data

(63) Continuation-in-part of application No. 17/146,646, filed on Jan. 12, 2021, now Pat. No. 11,624,036.

(60) Provisional application No. 62/960,925, filed on Jan. 14, 2020.

(51) Int. Cl.
*C10L 5/36* (2006.01)
*C10L 5/44* (2006.01)

(52) U.S. Cl.
CPC ............ *C10L 5/361* (2013.01); *C10L 5/447* (2013.01); *C10L 2230/088* (2013.01); *C10L 2290/02* (2013.01); *C10L 2290/08* (2013.01); *C10L 2290/30* (2013.01)

(58) Field of Classification Search
CPC ............ C10L 2290/08; C10L 2290/30; C10L 2290/32; C10L 2290/54; C10L 5/08; C10L 5/361; C10L 5/442; C10L 5/447; C10L 9/08; C10L 2230/088; C10L 2290/02; C10L 5/44; Y02E 50/10; Y02E 50/30
See application file for complete search history.

(56) References Cited

FOREIGN PATENT DOCUMENTS

| EP | 2714863 B1 | * | 9/2018 | ............. C10B 49/10 |
| JP | 2006306925 A | * | 11/2006 | |
| KR | 2009029502 A | * | 3/2009 | |
| KR | 101713495 B1 | * | 3/2017 | |
| KR | 2018085159 A | * | 7/2018 | |
| WO | WO-2012164162 A1 | * | 12/2012 | ............. C10B 49/10 |

* cited by examiner

*Primary Examiner* — Latosha Hines
(74) *Attorney, Agent, or Firm* — Gearhart Law, LLC

(57) ABSTRACT

A method to create a natural charcoal briquette is described herein. A wood material is collected and impurities are removed from the wood material. The wood material is dried at a temperature in a range of approximately 150° C. to approximately 200° C. to reach a moisture level in a range of approximately 3.7% to approximately 5.0%. The dried wood material is compressed in a shaped mold at approximately 300° C. and under 40 tons of pressure to form a charcoal briquette. The charcoal briquette is carbonized at a temperature in a range of approximately 700° C. to approximately 800° C. in a range of approximately 14 days to approximately 17 days. The charcoal briquette is then cooled for approximately 2 days prior to use or packaging.

12 Claims, 5 Drawing Sheets

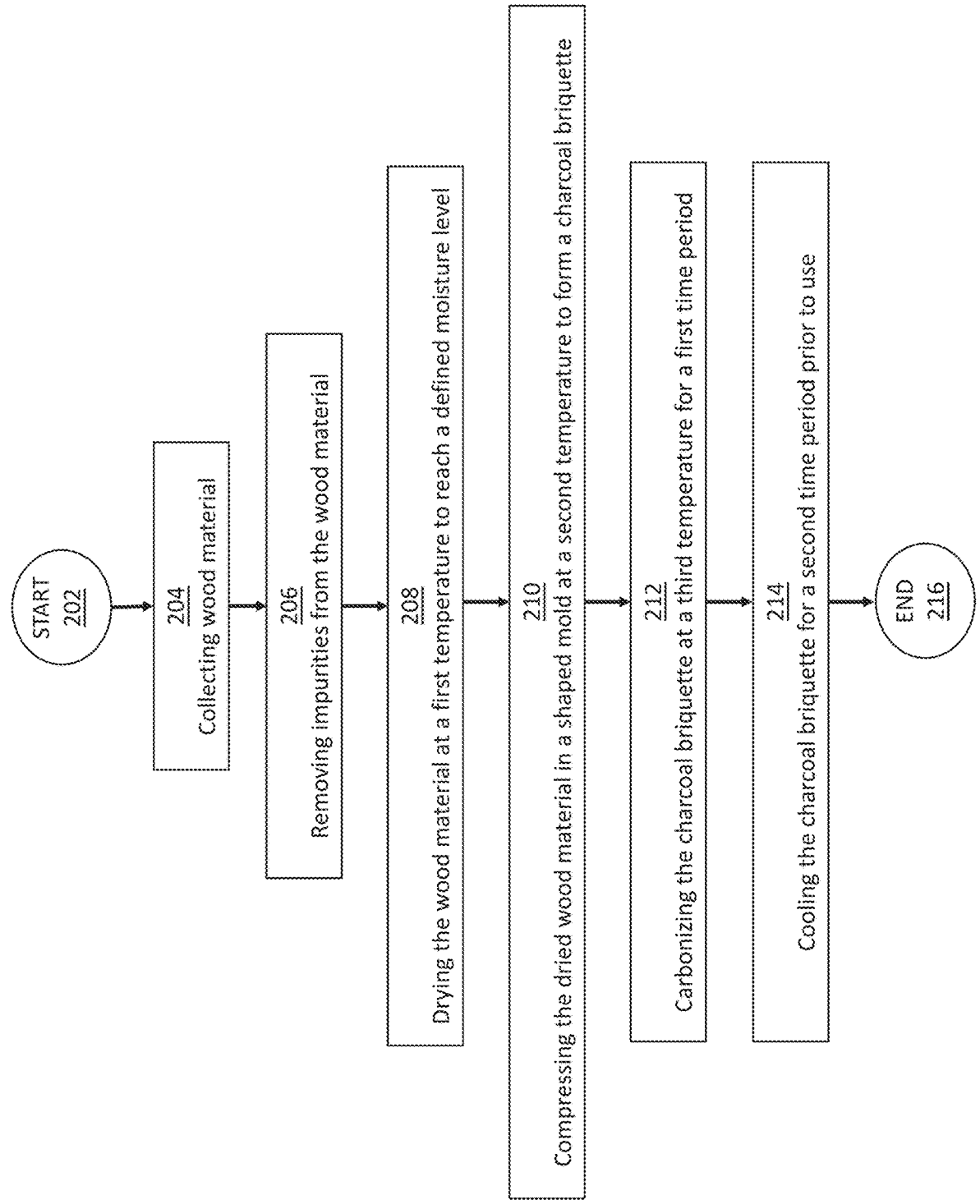

SAWDUST CHARCOAL

This is a U.S. CIP application that claims priority to U.S. Non-Provisional application Ser. No. 17/146,646 filed Jan. 12, 2021, which claims priority to U.S. Provisional Application No. 62/960,925, filed Jan. 14, 2020, all of which are hereby incorporated by reference in their entirety as if fully set forth herein.

FIELD

The field of the invention and its embodiments relate to a method for creating a charcoal briquette, and in particular an all-natural charcoal briquette consisting of a wood material, that is both smokeless and odorless when burned.

BACKGROUND

The outdoor barbeque has become a tradition for cooking and social gatherings in North America, and has become especially popular during national holidays, such as Memorial Day and Independence Day. Gas barbeques have increasingly gained popularity due to their ease of use. However, use of gas barbeques renders the grilled food with a lack of the unique smell and flavor of charcoal, and as such, many resort to cooking with charcoal or charcoal briquettes. An added benefit of cooking with charcoal or charcoal briquettes is that it is both simple and convenient.

Charcoal is also widely available in multiple formats, including lump charcoal, charcoal briquettes, and pre-soaked charcoal briquettes. Lump charcoal typically comprises randomly sized chunks of pre-burned hardwood. The popularity of lump charcoal resides in the fact that it is easy to use and ignites quickly. However, lump charcoal has a short life span.

A briquette is a compressed block of combustible biomass material (e.g. charcoal, sawdust, wood chips, peat, or paper) used for fuel and kindling to start a fire. In some examples, briquettes may be brick-shaped and stackable. Charcoal briquettes are typically uniform in size and are an excellent, economical fuel for cooking, as they provide consistent heat, and stay lit for a lengthy period of time. However, due to their dense composition, charcoal briquettes may be extremely difficult to ignite. To resolve this deficiency, lighter fluid or other toxic chemicals may be used to ignite the charcoal briquettes for cooking. In addition, these harsh lighting fluids or chemicals leave a residue on the charcoal briquettes if not completely burned off. This residue not only alters the taste of the food as it is cooked, but deposits a degree of toxicity to the cooked food.

Pre-soaked charcoal briquettes have the same composition as untreated charcoal briquettes, but may also be infused with starter fluid for easy igniting. These fluids create the same toxic problems present with use of the charcoal briquettes.

Thus, a need exists in the field for an inexpensive and 100% natural charcoal briquette free from additives, binders, and/or fuels. In particular, the present invention and its embodiments provide a method for creating a charcoal briquette that is both smokeless and odorless. In particular, the present invention and its embodiments provide a method for creating an all-natural charcoal briquette comprising a wood material and having a fixed carbon content of approximately 90%.

Review of Related Technology

CN 203700311 U describes a hollow-designed charcoal prepared from crop straws, rice husk, bamboo reeds, and various shrub residual branches.

U.S. Pat. No. 3,575,884 A describes a method to produce active charcoal from sawdust treated with sulfuric acid.

U.S. Pat. No. 3,268,310 A describes charcoal treated with 2-dioxanone to improve the ease of ignition of the charcoal.

U.S. Published Patent Application No. 2018/0103798 A1 describes a fuel disc for use with a barbecue grill made from charcoal that optionally includes hardwood chips.

WO 2018/071112 A1 describes a fuel disc for use with a barbecue grill made from charcoal that optionally includes hardwood chips.

U.S. Published Patent Application No. 2013/0219779 A1 describes a method to convert wood to charcoal.

CN 100396191 C describes a method to prepare natural bamboo charcoal.

U.S. Published Patent Application No. 2011/0262874 A1 describes an odorless and non-toxic alternative to using bagged charcoal briquettes. Specifically, this reference describes natural charcoal briquettes made of compressed charred hardwood and other organic materials.

WO 2019/146815 A1 describes a cube-shaped fire ignition container and, more particularly, to a cube shaped fire container in which The container itself is ignited to ignite charcoal contained therein, thereby generating charcoal fire.

U.S. Published Patent Application No. 2018/0290096 A1 describes a non-extruded filter article, including: an activated carbon honeycomb substrate having a plurality of flow-through channels and porous walls, and the activated carbon substrate comprises a carbon in from 90 to 99,9 wt. % of the article, and the porous walls have a percentage porosity of from 40% to 65%.

These references describe attempts to remedy certain drawbacks associated with charcoal briquettes. However, none provide for creating an all-natural charcoal briquette that is both smokeless and odorless when burned.

SUMMARY

The present invention and several example embodiments provide for creating a charcoal briquette that is both smokeless and odorless. In particular, a method for creating such an all-natural charcoal briquette is described, and the resulting briquettes are described.

An overview of a process for making certain embodiments of charcoal briquettes consisting of sawdust comprises gathering sawdust and drying it until the moisture content is in the range of about 3% to about 15%, heating and compressing the dried sawdust to form briquettes, further heating the briquettes to carbonize them, and cooling the carbonized briquettes for packaging or use.

A first example embodiment of the invention is a method to create a natural charcoal briquette. The method includes collecting hardwood sawdust, which may be available as a byproduct of some manufacturing process that includes cutting wood, for example. Of course, the sawdust may be made just for the purpose of making briquettes. The method then includes removing from the sawdust anything that is not sawdust, for example where the sawdust may include impurities such as plastic and/or metal impurities. This may be particularly important if the collected sawdust is a byproduct of some other process.

Next, the collected sawdust is dried. This may be accomplished by heating and compressing the collected sawdust, which may be done at a fairly wide range of temperatures, pressures, and durations. A currently preferred drying process heats the sawdust to a first temperature in a range of approximately 150° C. to approximately 400° C. at ambient atmospheric pressure. This temperature is maintained until the moisture level is between 3% and 15%, and preferably less than 6%. Ideally, the sawdust is dried until the moisture level is in a range of approximately 3.7% to approximately 4.5%.

The dried sawdust is then compressed into a preferred shape. This may be accomplished for example by pushing the dried sawdust through a select output template of an extruder machine to produce a continuing length of bar-like dried sawdust material having a desired cross section, then cutting the extruded material into pieces of a preferred length. The cuttings may then be placed into a mold having substantially the same cross section as the extruded material and the same length as the cuttings. In embodiments, the mold may be configured to mark the material with a logo or trademark or the like, such as by embossing or debossing. Preferably, the mold has a shape that allows the compressed sawdust to be removed easily from the mold. A currently preferred embodiment uses a hexagonal cross section-shaped extruder template and a mold having a uniform hexagonal cross section of the same size, prefereably between 2 to 4 centimeters in diameter. The sawdust in the mold is then subjected to an appropriate amount of pressure for a sufficient time to create a firmly compressed and solid sawdust briquette. In a currently preferred method, the sawdust may subjected to pressure in the range of 0.3 to 5 tons and heated to a temperature in the range of 350° C. to 400° C. The pressure and temperature are applied until firmly compressed briquettes are formed. In a currently preferred embodiment, the briquettes are formed in the shape of bars with a hexagonal cross section, but other shapes may be used.

The bars may then be carbonized by applying an appropriate amount of additional heat for a sufficient time. In a currently preferred embodiment, the formed compressed bars (or briquettes having a different shape) are carbonized by placing them in a kilning chamber at a temperature in the range of 700° C. to 800° C. for 7 to 17 days. Alternatively, a bio char furnace may be used for a period of 8 to 48 hours. The carbonized charcoal bars or briquettes are then cooled before use or packaging. In a currently preferred embodiment, the carbonized charcoal shapes may be left to cool at an ambient atmospheric temperature for at least 2 days. At the end of this manufacturing process, the carbonized charcoal bars or briquettes have a uniform density and a carbon content of at least 75%, and preferably more than 87%. Charcoal molded shapes made in accordance with the foregoing are a 100% natural wood based product that are smokeless, odorless, and have no additives, no binders, and no extra fuels. Such briquettes have a burn time of 4 hours or more, do not make sparks when burning, and leave ash residue of 3% or less.

Overall the end result charcoal shapes should have a Hardgrove Grindability

Index of 68.0 and contain less than 10% Volatile matter.

Recent analysis of such a natural charcoal briquette determined it had a fixed carbon content of approximately 90.44%, an ash content of approximately 4.85%, a volatile matter content of approximately 4.71%, a gross calorific value of approximately 7553 Kcal/kg, a total sulfur content of approximately 0.04%. These values are representative of briquettes made in accordance with the foregoing. Values within a range of 20% above and below these values may be expected. Ideally, values within a range or 10% above and below these values may be achieved.

In example embodiments, the cross section of a natural charcoal bar-like briquette made in accordance with the foregoing method may be a rectangular shape, a hexagonal shape, a diagonal shape, a triangular shape, a quadrilateral shape, a pentagonal shape, a hexagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, an icosagonal shape, a circular shape, or an elliptical shape.

In the case a polygonal shape is used to form the charcoal briquette, the briquette may have a first planar end disposed opposite a second planar end and a uniform cross sectional body located between the first planar end and the second planar end. A currently preferred embodiment comprises a body having six planar sides, wherein each of the six planar sides is adjacent another one of the six planar sides and meets the other planar side at an edge. This charcoal briquette may also comprise six cylindrical columns, each of which is disposed along a length of the cylindrical body at a respective edge.

In general, the present invention succeeds in conferring the following benefits and objectives.

It is an object of the present invention to provide an all-natural charcoal briquette.

It is an object of the present invention to provide an all-natural charcoal briquette containing no additives, binders, and/or fuels.

It is an object of the present invention to provide an all-natural charcoal briquette that is smokeless and odorless.

It is an object of the present invention to provide an all-natural charcoal briquette having an increased burn time as compared to traditional charcoal briquettes.

It is an object of the present invention to provide an all-natural and hexagonal-shaped charcoal briquette.

BRIEF DESCRIPTION OF THE DRAWINGS

The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims.

In the drawings:

FIG. 5 illustrates a block diagram of a method to create a natural charcoal briquette, in accordance with embodiments of the present invention.

DETAILED DESCRIPTION

Figure 1:
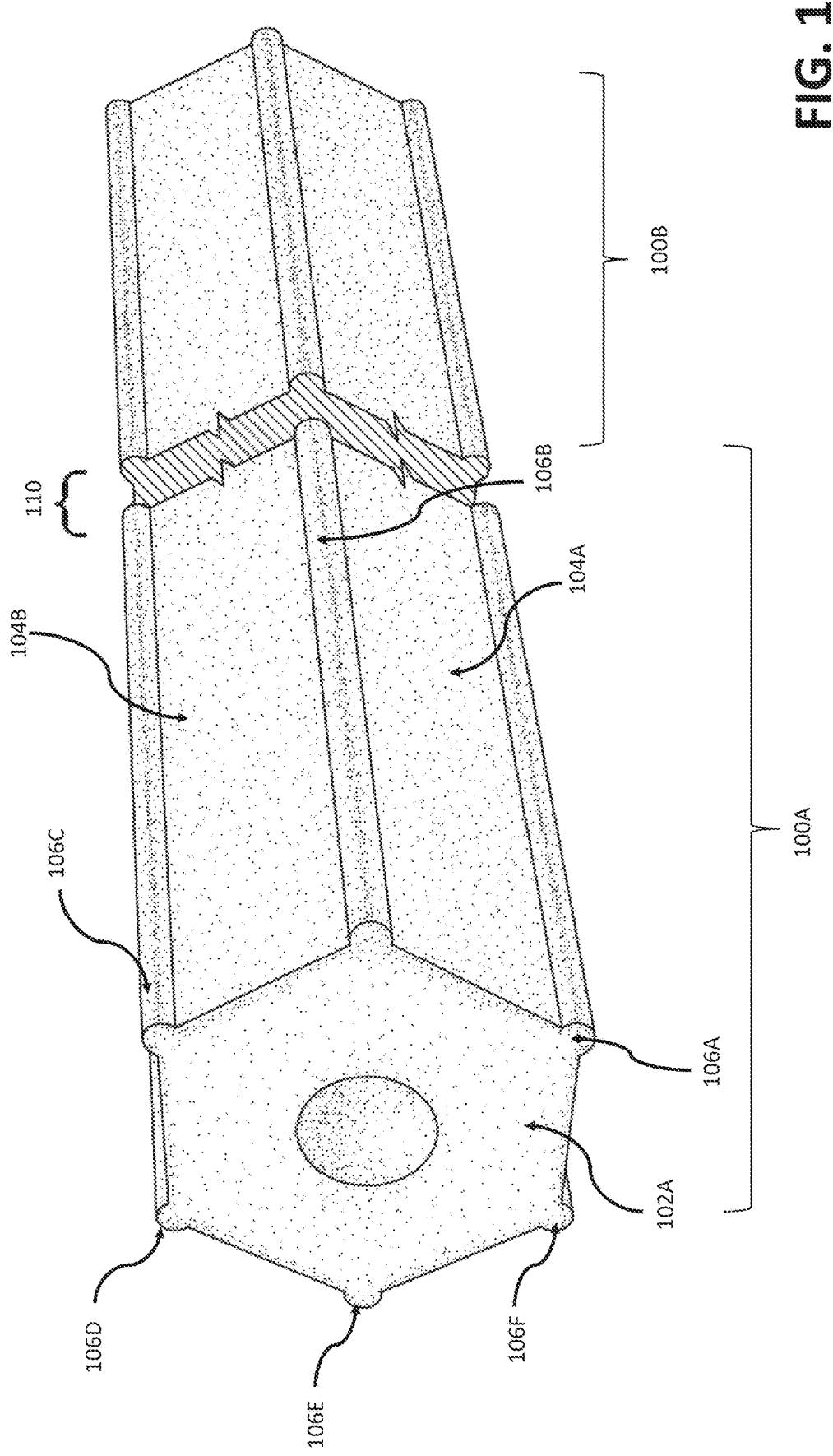
FIG. 1 illustrates a front perspective view of a hexagonal-shaped charcoal briquette, in accordance with embodiments of the present invention.

Various example embodiments of the present invention will now be described with reference to the drawings. Identical elements in the various figures are identified with the same reference numerals.

It is to be understood that the figures and descriptions provided herein may have been simplified to illustrate aspects that are relevant for a clear understanding of the herein described processes, machines, manufactures, and/or compositions of matter, while eliminating, for the purpose of clarity, other aspects that may be found in typical devices, systems, and methods. Those of ordinary skill in the pertinent art may recognize that other elements and/or steps may be desirable and/or necessary to implement the devices, systems, and methods described herein. Because such elements and steps are well known in the art, and because they do not facilitate a better understanding of the present disclosure, a discussion of such elements and steps may not be provided herein. However, the present disclosure is deemed to inherently include all such elements, variations, and modifications to the described aspects that would be known to those of ordinary skill in the pertinent art.

It will be readily understood that the components of the present invention, as generally described and illustrated in the figures herein, may be realized in a variety of different configurations. Thus, the following detailed description of the embodiments of a method, apparatus, and system, as represented in the attached figures, is not intended to limit the scope of the invention as claimed, but is merely representative of selected illustrative embodiments of the invention. The usage of the phrases "example embodiments", "some embodiments", or other similar language, throughout this specification refers to the fact that a particular feature, structure, or characteristic described in connection with the embodiment may be included in at least one embodiment of the present invention, and do not necessarily all refer to the same group of embodiments.

As used herein, a "briquette" is a compressed and carbonized block of hardwood sawdust used for fuel and kindling to start a fire.

Figure 3:
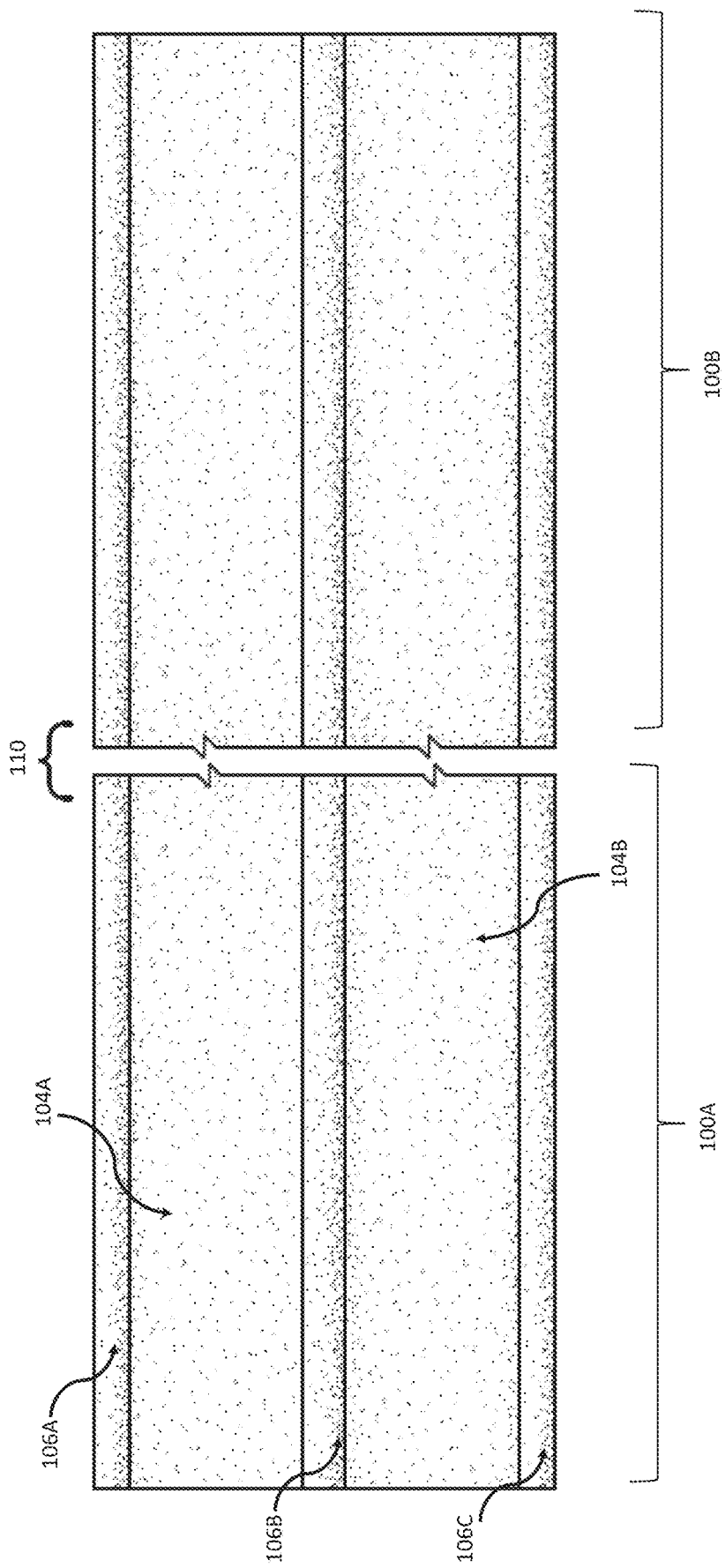
FIG. 3 illustrates a side elevational view of a hexagonal-shaped charcoal briquette, in accordance with embodiments of the present invention.
Figure 4:
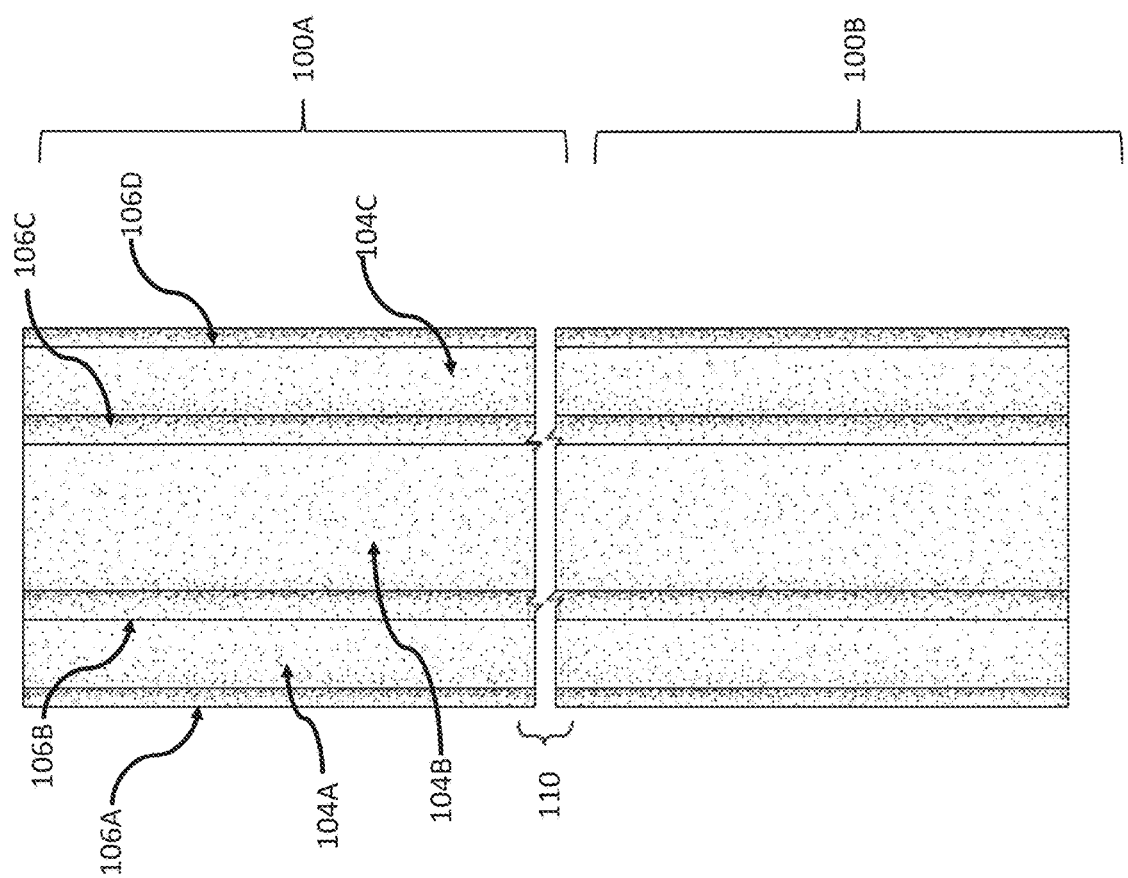
FIG. 4 illustrates a top plan view of a hexagonal-shaped charcoal briquette, in accordance with embodiments of the present invention.

A first all-natural charcoal briquette 100A and a second all-natural charcoal briquette 100B are depicted in FIG. 1, FIG. 3, and FIG. 4. As depicted in FIG. 1, FIG. 3, and FIG. 4, a gap 110 may be located between the all-natural charcoal briquette 100A and the all-natural charcoal briquette 100B. Moreover, all-natural charcoal briquette 100A may have a protrusion that may be accepted by a recession of the other all-natural charcoal briquette 100B at one or more locations to affix the all-natural charcoal briquette 100A to the other all-natural charcoal briquette 100B or to stack the all-natural charcoal briquette 100A and the other all-natural charcoal briquette 100B.

Figure 2:
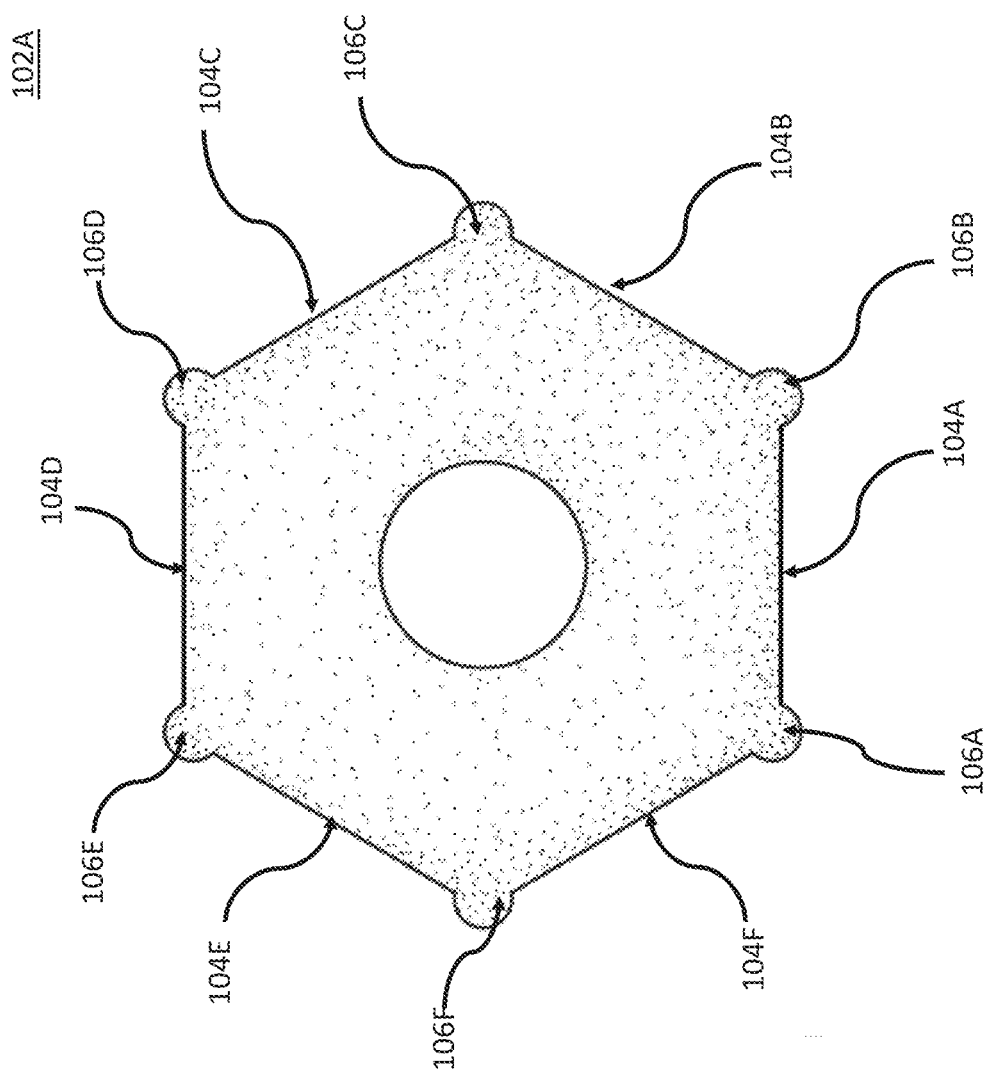
FIG. 2 illustrates a front elevational view of a hexagonal-shaped charcoal briquette, in accordance with embodiments of the present invention.

As depicted in FIG. 1, FIG. 3, and FIG. 4, the all-natural charcoal briquette 100A and the other all-natural charcoal briquette 100B are hexagonal in shape. As depicted in FIG. 1, FIG. 3, and FIG. 4, the all-natural charcoal briquette 100A has a first planar end 102A (as depicted in FIG. 2) disposed opposite a second planar end 102B (not shown). It should be appreciated that the first planar end 102A is identical to the second planar end 102B. Moreover, the all-natural charcoal briquette 100A has a prismatic body located between the first planar end 102A and the second planar end 102B.

The prismatic body has six planar sides, which include: a first planar side 104A, a second planar side 104B, a third planar side 104C, a fourth planar side 104D, a fifth planar side 104E, and a sixth planar side 104F (as depicted in FIG. 2). A planar side of the six planar sides (e.g., the first planar side 104A) is adjacent another planar side of the six planar sides (e.g., the second planar side 104B) and meets the other planar side (e.g., the second planar side 104B) at an edge. Moreover, the all-natural charcoal briquette 100A has six cylindrical columns, which include: a first column 106A, a second column 106B, a third column 106C, a fourth column 106D, a fifth column 106E, and a sixth column 106F (as depicted in FIG. 2). Each of the six cylindrical columns is disposed along a length of the prismatic body at the edge. For example and as depicted in FIG. 2, the first column 106A is located at the edge between the first planar side 104A and the sixth planar side 104F, where the first planar side 104A is located adjacent the sixth planar side 104F. As another example, and as shown in FIG. 2, the second column 106B is located at the edge between the first planar side 104A and the second planar side 104B, where the first planar side 104A is located adjacent the second planar side 104B.

It should be appreciated that, as depicted, the shape of the all-natural charcoal briquette 100A is identical to or substantially similar to the shape of the other all-natural charcoal briquette 100B. However, in other examples, the all-natural charcoal briquette 100A has a first shape and the other all-natural charcoal briquette 100B has a second shape, where the first shape differs from the second shape.

Moreover, it should be appreciated that other shapes of the all-natural charcoal briquette 100A and the other all-natural charcoal briquette 100B are contemplated. For example, the shape of the all-natural charcoal briquette 100A and/or the other all-natural charcoal briquette 100B may be: a rectangular shape, a hexagonal shape, a diagonal shape, a triangular shape, a quadrilateral shape, a pentagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, and/or an icosagonal shape. In other examples, shape of the all-natural charcoal briquette 100A and/or the other all-natural charcoal briquette 100B may be: a circular shape and/or a substantially circular shape. However, the shape of the all-natural charcoal briquette 100A and/or the other all-natural charcoal briquette 100B are not limited to the shapes explicitly described herein and other shapes are contemplated.

A flowchart for a method 200 to create a natural charcoal briquette (e.g., the all-natural charcoal briquette 100A and/or the other all-natural charcoal briquette 100B as depicted in FIG. 1, FIG. 3, and FIG. 4) is depicted in FIG. 5. The method may start at a process step 202, which is followed by process step 204 that includes collecting a wood material. The wood material may be sawdust and/or hardwood. Traditional charcoal briquettes used for cooking may include numerous components, such as: a fuel (e.g., wood charcoal, lignite coal, anthracite coal, etc.), an ash colorant (e.g., limestone), a binder (e.g., starch), a release agent (e.g., borax), and an accelerant (e.g., sodium nitrate), among other components. In some examples, traditional charcoal briquettes may additionally include sawdust, wax, rice chaff, peanut chaff, sulfuric acid, and/or 2-dioxanone, etc. Thus, differing from traditional charcoal briquettes, the natural charcoal briquette (e.g., the all-natural charcoal briquette 100A and/or the other all-natural charcoal briquette 100B as depicted in FIG. 1, FIG. 3, and FIG. 4) contain no additives, binders, and/or fuels, making the product more eco-friendly and safer for the environment.

The process step 204 may be followed by a process step 206, where one or more impurities may be removed from the wood material. Each of the one or more impurities may be a plastic impurity or a metal impurity. Next, the process step 206 is followed by a process step 208, where the wood material is dried at a first temperature to reach a predetermined moisture level. According to examples, the first temperature is in a range of approximately 150° C. to approximately 400° C. Moreover, the predetermined moisture level is in a range of 3% to 15%. For example, the predetermined moisture level may be approximately 4.95%. Then, the process step 208 is followed by a process step 210, where the dried wood material is compressed in a shaped mold at a second temperature and under pressure in the range of 0.3 to 5 tons to form a charcoal briquette (e.g., the all-natural charcoal briquette 100A and/or the other all-natural charcoal briquette 100B as depicted in FIG. 1, FIG. 3, and FIG. 4). In some examples, the charcoal briquette (e.g., the all-natural charcoal briquette 100A and/or the other all-natural charcoal briquette 100B as depicted in FIG. 1, FIG. 3, and FIG. 4) may be a compressed bar. In other examples, the shaped mold has a hexagonal-shaped cross section having a size in a range of approximately 2 centimeters to approximately 4 centimeters in diameter. According to examples, the second temperature is in a range of 350° C. to 400° C.

Next, the process step 210 is followed by a process step 212, where the charcoal briquette (e.g., the all-natural charcoal briquette 100A and/or the other all-natural charcoal briquette 100B as depicted in FIG. 1, FIG. 3, and FIG. 4) is carbonized at a third temperature for a first time period. In some examples, the carbonization may occur via a kilning chamber. However, the carbonization is not limited to use of the kilning chamber. According to some examples, the third temperature is in a range of approximately 700° C. to approximately 800° C. Moreover, the first time period is in a range of approximately 7 days to approximately 17 days.

Lastly, the process step 212 is followed by a process step 214, where the charcoal briquette (e.g., the all-natural charcoal briquette 100A and/or the other all-natural charcoal briquette 100B as depicted in FIG. 1, FIG. 3, and FIG. 4) is cooled for a second time period prior to use or packaging. The second time period is approximately 2 days. The process step 214 is followed by a process step 216, which ends the method 200 to create the natural charcoal briquette (e.g., the all-natural charcoal briquette 100A and/or the other all-natural charcoal briquette 100B as depicted in FIG. 1, FIG. 3, and FIG. 4).

At conclusion of the method 200 to create the natural charcoal briquette (e.g., the all-natural charcoal briquette 100A and/or the other all-natural charcoal briquette 100B as depicted in FIG. 1, FIG. 3, and FIG. 4), the all-natural charcoal briquette 100A and the other all-natural charcoal briquette 100B has many desirable properties. The all-natural charcoal briquette 100A and/or the other all-natural charcoal briquette 100B is 100% natural and contains no additives, binders, and/or fuels. Moreover, the all-natural charcoal briquette 100A and/or the other all-natural charcoal briquette 100B when burning is smokeless, odorless, contains no spark, and has a burn time of at least 4 hours.

Further, the all-natural charcoal briquette 100A and/or the other all-natural charcoal briquette 100B have a fixed carbon content of approximately 90%. For example, the fixed carbon content of the all-natural charcoal briquette 100A and/or the other all-natural charcoal briquette 100B may be approximately 90.44%. The all-natural charcoal briquette 100A and/or the other all-natural charcoal briquette 100B has an ash content of approximately 4.85%, a volatile matter content of approximately 4.71%, a gross calorific value of approximately 7553 Kcal/kg, and a total sulfur content of approximately 0.04%. Further, the all-natural charcoal briquette 100A and/or the other all-natural charcoal briquette 100B each have a uniform density throughout their body.

In practice, the variables shown and/or described herein may be expected to be in the range of 20% above and below the values shown in the foregoing. Values in the range of 10% above and below the values shown and/or described may be achieved.

In summary, a method of creating a natural charcoal briquette is disclosed comprising collecting hardwood sawdust; removing non-wood impurities from the sawdust; drying the sawdust at a first temperature to reach a predetermined moisture level; compressing the dried sawdust in a shaped mold at a second temperature to form a charcoal briquette; carbonizing the charcoal briquette at a third temperature for a first time period; and cooling the charcoal briquette for a second time period prior to use or packaging. The impurities removed consist of plastic, metal, or both.

The first temperature is in a range of 150° C. to 450° C., the second temperature is about 300° C., and the third temperature is in a range of 700° C. to 800° C. The predetermined moisture level of the dried sawdust is in a range of 3.7% to 5.0%, and the compression of the dried sawdust occurs by applying a pressure in the range of 0.3 to 5 tons. The first time period is in a range of 7 days to 17 days; and the second time period is 2 days.

In summary, the resulting charcoal briquette consists of sawdust, has a uniform density, a fixed carbon content of 90%, and a burn time of at least 4 hours. When burning, the briquette is smokeless, odorless, and sparklers. A completely burned briquette has an ash residue of no more than 5% after burning. Further, the briquette has a Hardgrove Grindability index of 68, and comprises less than 10% Volatile matter. Preferably, the charcoal briquette has a volatile matter content within 10% of 4.7 parts per hundred; a gross calorific value within 10% of 7500 Kcal/kg; and a total sulfur content within 10% of four parts per hundred.

The cross-sectional shape of the resulting charcoal briquette is selected from the group consisting of: a rectangular shape, a hexagonal shape, a diagonal shape, a triangular shape, a quadrilateral shape, a pentagonal shape, a hexagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, an icosagonal shape, a circular shape, and an oval shape.

In further summary, a currently preferred charcoal briquette is disclosed comprising a body having a cross sectional shape of a regular hexagonal prism with first and second planar ends and six planar sides between the ends. Each side is adjacent to two others of the planar sides, and meets the two other planar sides at a respective edge. In addition, the hexagonal briquette has six cylindrical columns, each disposed along a length of the body at a respective edge. The hexagonal-shaped charcoal briquette consists only of compressed hardwood sawdust; has a uniform density; has a burn time of at least 4 hours; when burning it is essentially smokeless, odorless, and sparklers; and leaves an ash residue after burning of no more than 5%.

Moreover, the disclosed charcoal briquette can be expected to have a fixed carbon content within 10% of 90 parts per 100; and a total sulfur content within 10% of four parts per hundred. Further, such a briquette may contain volatile matter within 10% of 4.7 parts per hundred; may have a gross energy content within 10% of 7500 Kcal/kg; and may have a Hardgrove Grindability index within 10% of 68.0.

As noted previously, these values and ranges are representative of briquettes made in accordance with the method summarized previously. Values of all of the foregoing variables can be expected to be within a range of 20% above and below these values. Further, values within a range of 10% above and below these values can be achieved.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although the invention has been described and illustrated in exemplary forms with a certain degree of particularity, it is noted that the description and illustrations have been made by way of example only. Numerous changes in the details of construction, combination, and arrangement of parts and steps may be made without deviating from the scope of the invention. Accordingly, such changes are understood to be inherent in the disclosure, provided they fall within the scope of the appended claims. That is, the invention is not limited except by the appended claims and the elements and arrangements explicitly recited therein. The scope of the claims should be construed as broadly as the prior art will permit. It should also be noted that the elements of all of the claims may be combined with each other in any possible combination without departing from the scope of the claims, even if the combinations have not been expressly claimed.

What is claimed is:

1. A method of creating a natural charcoal briquette, the method comprising:
    collecting hardwood sawdust;
    removing non-wood impurities from the sawdust;
    drying the sawdust at a first temperature in the range of 150° C. to 450° C. to reach a predetermined moisture level;
    compressing the dried sawdust in a shaped mold at a second temperature in the range of 350° C. to 400° C. at an applied pressure in the range of 0.3 tons to 5.0 tons to form a charcoal briquette;
    carbonizing the briquette at a third temperature of 700°-800° C. for a first time period in the range of 7-17 days to form a charcoal briquette; and
    cooling the charcoal briquette at ambient temperature for a second time period of at least two days prior to use or packaging.

2. The method of claim 1, wherein the impurities consist of plastic, metal, or both.

3. The method of claim 1, wherein the second temperature is about 350° C.

4. The method of claim 1, wherein the predetermined moisture level is in a range of 3.7% to 5.0%.

5. A charcoal briquette consisting of sawdust, the charcoal briquette having a uniform density, a fixed carbon content of 90%, and a burn time of at least 4 hours.

6. The charcoal briquette of claim 5 that, when burning, is smokeless, odorless, and sparkless.

7. The charcoal briquette of claim 5, having an ash residue of no more than 5% after burning.

8. The charcoal briquette of claim 5, having a Hardgrove Grindability Index of 68.0 and Volatile matter of less than 10%.

9. The charcoal briquette of claim 5, having a volatile matter content no more than 10% of 4.7 parts per hundred.

10. The charcoal briquette of claim 5, having a gross calorific value within 10% of 7500 Kcal/kg.

11. The charcoal briquette of claim 5, having a total sulfur content within 10% of four parts per hundred.

12. The charcoal briquette of claim 5, wherein a shape of the charcoal briquette is selected from the group consisting of: a rectangular shape, a hexagonal shape, a diagonal shape, a triangular shape, a quadrilateral shape, a pentagonal shape, a hexagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, an icosagonal shape, a circular shape, and an oval shape.

* * * * *